US010719127B1

(12) United States Patent
Keith

(10) Patent No.: US 10,719,127 B1
(45) Date of Patent: Jul. 21, 2020

(54) EXTENDED LIFE DISPLAY BY UTILIZING EYE TRACKING

(71) Applicant: Rockwell Collins, Inc., Cedar Rapids, IA (US)

(72) Inventor: Christopher A. Keith, Wilsonville, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 77 days.

(21) Appl. No.: 16/115,725

(22) Filed: Aug. 29, 2018

(51) Int. Cl.
G06F 3/01 (2006.01)
G09G 3/3208 (2016.01)

(52) U.S. Cl.
CPC ........... *G06F 3/013* (2013.01); *G09G 3/3208* (2013.01); *G09G 2320/043* (2013.01); *G09G 2320/0626* (2013.01); *G09G 2320/0686* (2013.01); *G09G 2320/08* (2013.01); *G09G 2340/045* (2013.01); *G09G 2340/0464* (2013.01); *G09G 2354/00* (2013.01)

(58) Field of Classification Search
CPC .. G06F 3/013; G09G 3/3208; G09G 2320/08; G09G 2340/0464; G09G 2320/0626; G09G 2320/0686; G09G 2340/045; G09G 2354/00; G09G 2320/043
USPC .......................................................... 345/156
See application file for complete search history.

(56) References Cited

U.S. PATENT DOCUMENTS

| 2003/0052903 | A1* | 3/2003 | Weast | G06F 1/3203 345/690 |
| 2007/0273611 | A1* | 11/2007 | Torch | A61B 3/112 345/8 |
| 2010/0110368 | A1* | 5/2010 | Chaum | G02B 27/017 351/158 |
| 2013/0135196 | A1* | 5/2013 | Park | G06F 3/01 345/156 |
| 2014/0132484 | A1* | 5/2014 | Pandey | G06F 3/012 345/8 |
| 2014/0247210 | A1* | 9/2014 | Henderek | G06F 3/041 345/156 |
| 2016/0156850 | A1* | 6/2016 | Werblin | G02B 27/017 348/63 |
| 2016/0189429 | A1* | 6/2016 | Mallinson | G06F 3/012 345/633 |

(Continued)

OTHER PUBLICATIONS

WikipediA, "Fovea centralis", Printed Aug. 17, 2018, 11 pages.
WikipediA, "Visual field", Printed Aug. 17, 2018, 5 pages.

*Primary Examiner* — Chineyere D Wills-Burns
(74) *Attorney, Agent, or Firm* — Suiter Swantz pc llo

(57) ABSTRACT

A system may include a display, an eye tracking system, and a processor. The processor may be configured to receive eye tracking data. The processor may be further configured to determine a foveal region of interest of the display based on the eye tracking data. The processor may be further configured to perform a display modification operation configured to a) reduce a brightness profile for at least some of pixels outside of the foveal region of interest, wherein the reduced brightness profile is less than a foveal region brightness profile for foveal region pixels corresponding to the foveal region of interest, and/or b) modify a non-foveal region image portion. The processor may be further configured to generate image data indicative of the performed display modification operation. The processor may be further configured to output the image data to the display.

19 Claims, 11 Drawing Sheets

(56) References Cited

U.S. PATENT DOCUMENTS

| | | | |
|---|---|---|---|
| 2016/0274365 A1* | 9/2016 | Bailey | G02B 27/0093 |
| 2017/0038590 A1* | 2/2017 | Jepsen | G09G 3/3426 |
| 2017/0090563 A1* | 3/2017 | Gustafsson | G06F 3/04815 |
| 2017/0329399 A1* | 11/2017 | Azam | G06F 1/3231 |
| 2018/0357752 A1* | 12/2018 | Ho | G06F 3/013 |
| 2018/0369702 A1* | 12/2018 | Hake | G06F 3/013 |
| 2019/0354174 A1* | 11/2019 | Young | G09G 5/37 |

* cited by examiner

EXTENDED LIFE DISPLAY BY UTILIZING EYE TRACKING

BACKGROUND

High-brightness organic light-emitting diode (OLED) displays are desirable for use in applications that require brightly lit, thin, and lightweight displays with high image quality. High-brightness displays may be capable of emitting light with a luminance of between 1,000 and 8,000 foot-lamberts. For example, a high-brightness OLED display may be used in a cockpit, where the high brightness of the display allows for clear viewing of the display even when the sun or a bright blue sky is viewable through the cockpit. Currently, high-brightness OLED displays, such as those used in aircraft and head wearable devices, have a relatively short lifespan compared to other display technologies due to luminance degradation over time from exposure to electrical current and heat. For example, high-brightness OLED displays often have a half-life luminance of between 400 and 2000 hours, whereas competing technologies often have a half-life luminance of between 10,000 and 40,000 hours. The brighter that an OLED display is lit, the quicker brightness decay occurs. The short half-life luminance of OLED displays increases the frequency for which OLED displays need to be replaced, which adds to the cost of using of OLED displays.

SUMMARY

In one aspect, embodiments of the inventive concepts disclosed herein are directed to a system. The system may include a display, an eye tracking system, and a processor communicatively coupled to the display and the eye tracking system. The display may be configured to present graphics to a user, and the display may include pixels. The eye tracking system may be configured to perform eye tracking operations of an eye of the user and to output eye tracking data. The processor may be configured to receive the eye tracking data. The processor may be further configured to determine a foveal region of interest of the display based on the eye tracking data. The processor may be further configured to perform a display modification operation. Performance of the display modification operation may be configured to a) reduce a brightness profile for at least some of the pixels outside of the foveal region of interest, wherein the reduced brightness profile is less than a foveal region brightness profile for foveal region pixels corresponding to the foveal region of interest, and/or b) modify a non-foveal region image portion, the non-foveal region image portion to be displayed outside of the foveal region of interest. The processor may be further configured to generate image data indicative of the performed display modification operation. The processor may be further configured to output the image data to the display for presentation to the user.

In a further aspect, embodiments of the inventive concepts disclosed herein are directed to a head wearable device. The head wearable device may include a display, an eye tracking system, and a processor communicatively coupled to the display and the eye tracking system. The display may be configured to present graphics to a user, and the display may include pixels. The eye tracking system may be configured to perform eye tracking operations of an eye of the user and to output eye tracking data. The processor may be configured to receive the eye tracking data. The processor may be further configured to determine a foveal region of interest of the display based on the eye tracking data. The processor may be further configured to perform a display modification operation. Performance of the display modification operation may be configured to a) reduce a brightness profile for at least some of the pixels outside of the foveal region of interest, wherein the reduced brightness profile is less than a foveal region brightness profile for foveal region pixels corresponding to the foveal region of interest, and/or b) modify a non-foveal region image portion, the non-foveal region image portion to be displayed outside of the foveal region of interest. The processor may be further configured to generate image data indicative of the performed display modification operation. The processor may be further configured to output the image data to the display for presentation to the user.

In a further aspect, embodiments of the inventive concepts disclosed herein are directed to a method. The method may include receiving, by a processor, eye tracking data. The processor may be communicatively coupled to a display and an eye tracking system. The display may be configured to present graphics to a user. The display may include pixels. The eye tracking system may be configured to perform eye tracking operations of an eye of the user and output the eye tracking data. The method may further include determining, by the processor, a foveal region of interest of the display based on the eye tracking data. The method may further include performing, by the processor, a display modification operation. Performance of the display modification operation may be configured to: a) reduce a brightness profile for at least some of the pixels outside of the foveal region of interest, wherein the reduced brightness profile is less than a foveal region brightness profile for foveal region pixels corresponding to the foveal region of interest, and/or b) modify a non-foveal region image portion, the non-foveal region image portion to be displayed outside of the foveal region of interest. The method may further include generating, by the processor, image data indicative of the performed display modification operation. The method may further include outputting, by the processor, the image data to the display for presentation to the user.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
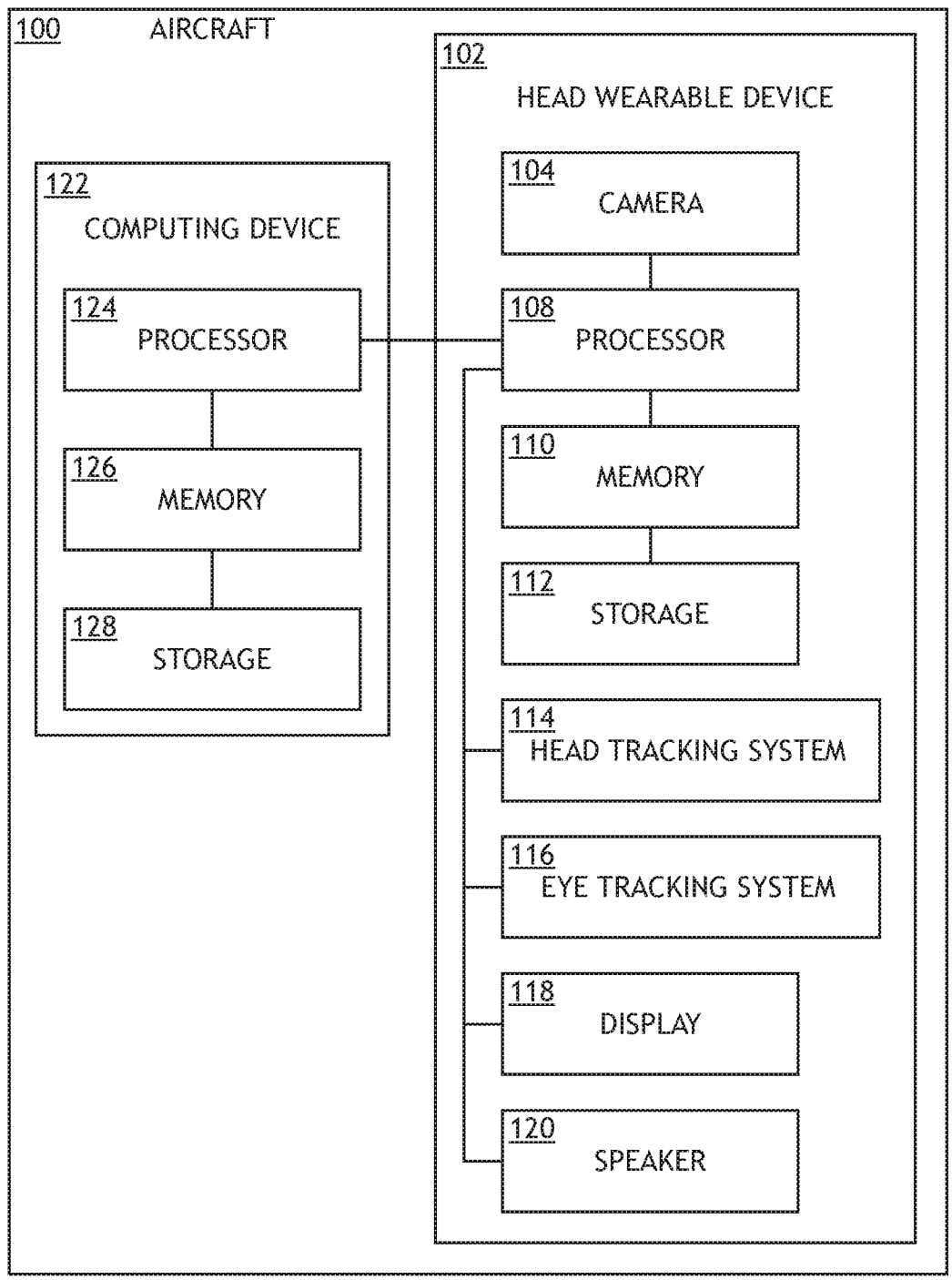
FIG. 1 is a view of an exemplary embodiment of a system including a vehicle including a head wearable device and a computing device according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method, system, and a device configured to extend the life of a display (e.g., an emissive display, such as a high-brightness organic light-emitting diode (OLED) display) by utilizing eye tracking.

Peak visual acuity of the human eye is a limited field of view and rolls off rather quickly. Embodiments may include an eye tracking system coupled to a processor, which may be configured to determine a foveal region of interest of a display and to modify a displayed image to extend a display's brightness lifetime. In some embodiments, a foveal region of interest of a display may be a region of the display corresponding to a portion of a user's foveal field of view. For example, the foveal region of interest of the display may correspond to approximately 18 degrees (e.g., 18 degrees +/−5 degrees) of arc of the user's field of view as measured from a user's eye position(s) (e.g., predetermined eye positions, such predetermined eye positions of a user with respect to a display of a head wearable device or a default eye position of a user with respect to a head down display) in relation to the display. A peak acuity region of the display may be approximately centered within the foveal region of interest of the display, and the peak acuity region may correspond to approximately 30 seconds (e.g., 30 seconds +/−10 seconds) of arc of the user's field of view as measured from a user's eye position(s) in relation to the display.

Embodiments may use eye tracking to extend the luminance degradation lifespan of a display (e.g., an emissive display, such as a high-brightness organic light-emitting diode (OLED) display or any other display technology where brightness degrades over time). Some embodiments may include lowering or modifying a display brightness and/or other characteristics based on where a user is looking on a display area without loss of display performance or user experience. For example, a brightness reduction gradient may be applied to pixels outside of a foveal region of interest of the display such that pixel brightness is reduced across the display as a distance away from the foveal region of interest increases. Additionally, for example, a non-foveal region image portion (e.g., a subpixel, a small pixel, and/or multiple pixels outside of the foveal region of interest) may be modified, such as by moving, miniaturizing, magnifying, blurring, oscillating, and/or orbiting the non-foveal region image portion.

In some embodiments, the display may be implemented in a head-wearable device (e.g., a head worn display device or a helmet-mounted display device). In some embodiments, the display may be implemented as a near-eye display, such as a head-up display (HUD). In some embodiments, the display may be implemented as a head-down display (HDD). Some embodiments may be applied to augmented reality (AR), mixed reality (MR), or virtual reality (VR) display systems. Some embodiments may be most beneficial in displays that display relatively fixed imagery and/or symbols.

In some embodiments, a processor may be configured to execute software, receive eye tracking data, and perform image processing to extend the luminance half-life of a display.

Referring now to FIG. 1, an exemplary embodiment of a system according to the inventive concepts disclosed herein may include a vehicle (e.g., aircraft 100). The aircraft 100 may include at least one head wearable device 102 and at least one computing device 122, some or all of which may be communicatively coupled at any given time. For example, the head wearable device 102 may be configured to receive images (e.g., virtual scene images) from the computing device 122 and configured to provide a wearer of the head wearable device 102 with a virtual or mixed reality experience, for example, by blending the virtual images with real images (e.g., real scene images) to create combined three-dimensional immersive scene images, which are presented to the wearer of the head wearable device 102. While FIG. 1 exemplarily depicts elements of the system implemented in the aircraft 100, in some embodiments, elements of the system may be implemented in non-vehicular environments or in other types of vehicles, such as automobiles, spacecraft, trains, or watercraft.

The head wearable device 102 may be configured to present images (e.g., mixed reality or virtual reality scene images) to the wearer of the head wearable device 102. In some embodiments, the head wearable device 102 may be implemented as a mixed reality head wearable device or a virtual reality head wearable device. The head wearable device 102 may include at least one camera 104, at least one processor 108, at least one memory 110, at least one storage device 112, a head tracking system 114, an eye tracking system 116, at least one display 118, and at least one speaker 120, some or all of which may be communicatively coupled.

The camera 104 may be configured to capture real images (e.g., real scene images) of a wearing user's field of view. The camera 104's field of view may align with a wearing user's field of view. The camera 104 may be configured to output the real images as real image data (e.g., real scene image data) to the processor 108. The camera 104 may be configured to output a stream of real images as a stream of real image data to the processor 108. In some embodiments, the camera 104 may be implemented as a plurality of cameras.

The processor 108 may be implemented as any suitable processor, such as a general purpose processor, an image processor, and/or an FPGA. The processor 108 may be configured to receive images (e.g., virtual or mixed reality images) from the computing device 122 as image data (e.g., virtual or mixed reality image data) and/or the real images as real image data from the camera 104. In some embodiments, the images may be aligned with a wearing user's field of view, such as based on head tracking data obtained from the head tracking system 114. In some embodiments, the processor 108 may be configured to blend virtual or mixed reality image data and the real images. The processor 108 may be configured to output a stream of images (e.g., mixed reality images or virtual reality images) as image data (e.g., virtual or mixed reality image data) to the display 118 for presentation to a wearing user of the head wearable device 102.

Additionally, the processor 108 may be configured to receive eye tracking data from the eye tracking system 116. The processor 108 may be configured to determine a foveal region of interest of the at least one display based on the eye tracking data and a position of the user's eye(s) relative to the display 118. The processor 108 may be configured to perform at least one display modification operation. Performance of the at least one display modification operation may be configured to reduce a brightness profile for at least some of the pixels outside of the foveal region of interest, wherein the reduced brightness profile is less than a foveal region brightness profile for foveal region pixels corresponding to the foveal region of interest. For example, the reduced brightness profile for the at least some of the pixels outside of the foveal region of interest may include a gradual reduction in pixel brightness as a distance from the foveal region of interest increases. Additionally, performance of the at least one display modification operation may be configured to modify at least one non-foveal region image portion, the non-foveal region image portion to be displayed outside of the foveal region of interest. For example, the processor 108 may be configured to cause the non-foveal region image portion to move, miniaturize, magnify, blur, oscillate, and/or orbit around a point. The processor 108 may be configured to generate image data indicative of the at least one performed display modification operation. The processor 108 may be configured to output the image data to the display 118 for presentation to the user.

The processor 108 may be configured to extend the life of the display 118 by reducing the brightness or more evenly distributing brightness such that the pixels of the display 118 degrade less than if the display 118 had a uniform high brightness across the display area of the display 118.

In some embodiments, the at least one processor 108 may be implemented as a plurality of processors, such as at least one general purpose processor and at least one image processor. The processor 108 may be configured to run various software applications or computer code stored in a non-transitory computer-readable medium and configured to execute various instructions or operations. The processor 108 may be implemented as a special purpose processor configured to execute instructions for performing any or all of the operations disclosed throughout.

Figure 3:
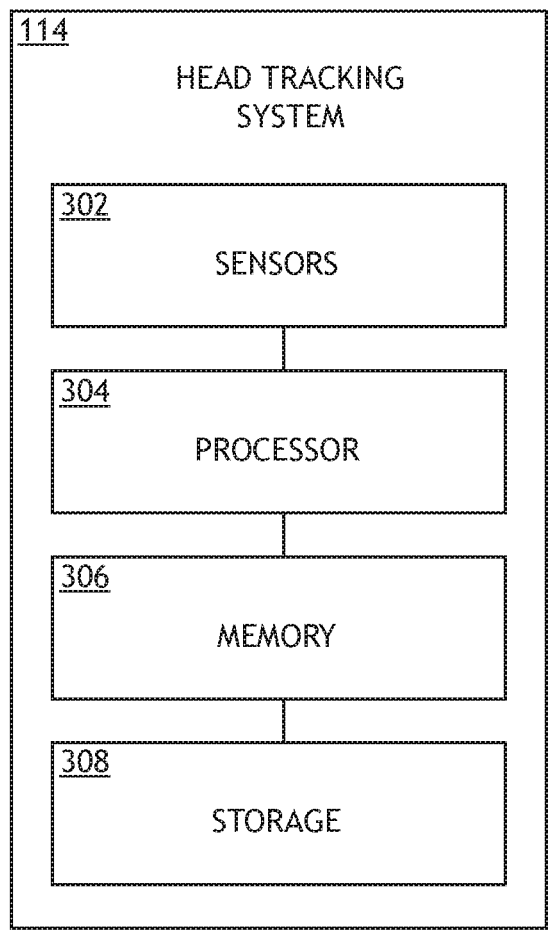
FIG. 3 is a view of the head tracking system of the head wearable device of FIG. 1 according to the inventive concepts disclosed herein.

The head tracking system 114 may be configured to determine and track a position and an orientation of a user's head relative to an environment. The head tracking system 114 may be configured for performing fully automatic head tracking operations in real time. The head tracking system 114 may include sensors 302, a processor 304, memory 306, and storage 308, as shown in FIG. 3, as well as other components, equipment, and/or devices commonly included in a head tracking system. The sensors 302, the processor 304, the memory 306, and the storage 308, as well as the other components, equipment, and/or devices commonly included in a head tracking system may be communicatively coupled.

The processor 304 of the head tracking system 114 may be configured to process data received from the sensors 302 and output processed data to the computing device 122 and/or the processor 108. For example, the processor 304 may be configured to determine and track a position and orientation of a user's head relative to an environment. Additionally, for example, the processor 304 may be configured to generate position and orientation data associated with such determined information and output the generated position and orientation data to the computing device 122 and/or the processor 108. The processor 304 of the head tracking system 114 may be configured to run various software applications or computer code stored in a non-transitory computer-readable medium and configured to execute various instructions or operations. The processor 304 may be implemented as a special purpose processor configured to execute instructions for performing any or all of the operations disclosed throughout.

Figure 2:
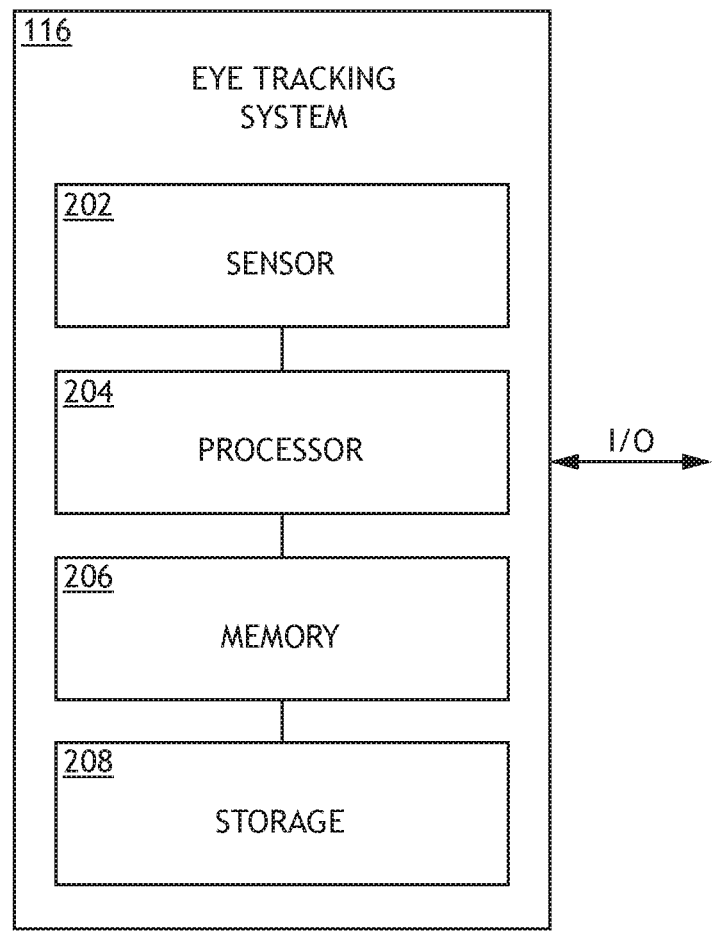
FIG. 2 is a view of the eye tracking system of the head wearable device of FIG. 1 according to the inventive concepts disclosed herein.

The eye tracking system 116 may be configured to track eye gestures, track movement of a user's eye, track a user's gaze, determine a location of a vergence point (sometimes referred to as a point of regard) of a user's gaze, determine eye locations, determine an intra-pupillary distance (IPD) between a user's eyes, determine a direction between a determined location of a user's eye and a determined location of a vergence point for each of a user's eyes, and/or otherwise receive inputs from a user's eyes. The eye tracking system 116 may be configured for performing fully automatic eye tracking operations of users in real time. The eye tracking system 116 may include at least one sensor 202, at least one processor 204, memory 206, and storage 208, as shown in FIG. 2, as well as other components, equipment, and/or devices commonly included in an eye tracking system. The sensor 202, the processor 204, the memory 206, and the storage 208, as well as the other components, equipment, and/or devices commonly included in an eye tracking system may be communicatively coupled.

The processor 204 of the eye tracking system 116 may be configured to process data received from the sensor 202 and output processed data to the processor 108 and/or the computing device 122. For example, the processor 204 may be configured to determine a location of a vergence point of a user's gaze, determine eye locations, determine an intra-pupillary distance (IPD) between a user's eyes, and/or determine a direction between a determined location of a user's eye and a determined location of a vergence point for each of a user's eyes. Additionally, for example, the processor 204 may be configured to generate data associated with such determined information and output the generated data to the processor 108 and/or the computing device 122. The processor 204 of the eye tracking system 116 may be configured to run various software applications or computer code stored in a non-transitory computer-readable medium and configured to execute various instructions or operations. The processor 204 may be implemented as a special purpose processor configured to execute instructions for performing any or all of the operations disclosed throughout.

The display 118 may be configured to receive a stream of images (e.g., mixed or virtual reality images) as a stream of image data (e.g., mixed or virtual reality image data) and present the stream of images to a wearing user of the head wearable device 102. The display 118 may be a transmissive display (e.g., a liquid crystal display (LCD)), an emissive display (e.g., a micro-LED display or an OLED display, such as active-matrix OLEDs (AMOLEDs), passive-matrix OLEDs (PMOLEDs), or light-emitting electrochemical cells (LECs)), or a cathode ray tube (CRT) display. The display 118 may be implemented as any suitable display, such as a see-through display (e.g., Microsoft Hololens) or an occluded display (e.g., Oculus Rift). Additionally, while the display 118 is depicted as a single display, the display 118 may be implemented as a plurality of displays, such as one display for each eye of a user.

The speaker 120 may be configured to receive audio content associated with an environment (e.g., a mixed or virtual reality environment) and to present the audio content as audio to a wearing user of the head wearable device 102. Additionally, while the speaker 120 is depicted as a single speaker, the speaker 120 may be implemented as a plurality of speakers, such as one speaker for each ear of a user.

While the camera 104, the processor 108, the memory 110, the storage device 112, the head tracking system 114, the eye tracking system 116, the display 118, and the speaker 120 of the head wearable device 102 have been exemplarily depicted as being implemented as separate devices or subsystems, in some embodiments, some or all of the camera 104, the processor 108, the memory 110, the storage device 112, the head tracking system 114, the eye tracking system 116, the display 118, and/or the speaker 120 may be implemented as a single integrated system or device or as any number of integrated and/or partially integrated subsystems and/or devices.

While the head wearable device 102 exemplarily includes elements as shown, in some embodiments, one or more of the elements of the head wearable device 102 may be omitted, or the head wearable device 102 may include other elements.

The computing device 122 may include at least one processor 124, at least one memory 126, and at least one storage device 128, as well as other components, equipment, and/or devices commonly included in a computing device, some or all of which may be communicatively coupled. The processor 124 may be implemented as any suitable processor, such as a general purpose processor, an FPGA, and/or an image processor. For example, the computing device 122 may be configured to receive position and orientation data (e.g., a stream of position and orientation data) from the head wearable device 102, wherein the position and orientation data is indicative of a position and orientation of the user's head. For example, the computing device 122 may be configured to receive position and orientation data from the head tracking system 114 of the head wearable device 102. Based at least on the position and orientation data, the processor 124 may be configured to generate an image (e.g., a virtual scene image) corresponding to a field of view of the wearer of the head wearable device 102. The processor may be configured to output the image as image data to the head wearable device 102. The processor 124 may be configured to generate a stream of images (e.g., virtual images) and output the stream of images (e.g., virtual images) as a stream of image data (e.g., virtual image data) to the head wearable device 102. The processor 124 may be configured to run various software applications or computer code stored (e.g., maintained) in a non-transitory computer-readable medium and configured to execute various instructions or operations. Additionally, for example, the computing device 122 or the processor 124 may be implemented as special purpose computers or special purpose processors configured (e.g., programmed) to execute instructions for performing any or all of the operations disclosed throughout. In some embodiments, the system of FIG. 1 may include any suitable number of computing devices 122, such as a plurality.

While the computing device 122 exemplarily includes elements as shown, in some embodiments, one or more of the elements of the computing device 122 may be omitted, or the computing device 122 may include other elements.

While the head wearable device 102 and the computing device 122 have been exemplarily depicted as being implemented as separate devices or systems, in some embodiments, some or all of the head wearable device 102 and the computing device 122 may be implemented as a single integrated system or device or as any number of integrated and/or partially integrated systems and/or devices.

While FIG. 1 exemplarily includes elements as shown, in some embodiments, one or more of the elements of the system may be omitted, or the system may include other elements. Additionally, while an embodiment has been depicted as including one head wearable device 102 and one computing device 122, other embodiments may include any number of head wearable devices 102 of various types and computing devices 122 of various types positioned or moving anywhere in the system.

Referring now to FIG. 2, the eye tracking system 116 of the head wearable device 102 of FIG. 1 is shown according to the inventive concepts disclosed herein.

Referring now to FIG. 3, the head tracking system 114 of the head wearable device 102 of FIG. 1 is shown according to the inventive concepts disclosed herein.

Figure 4:
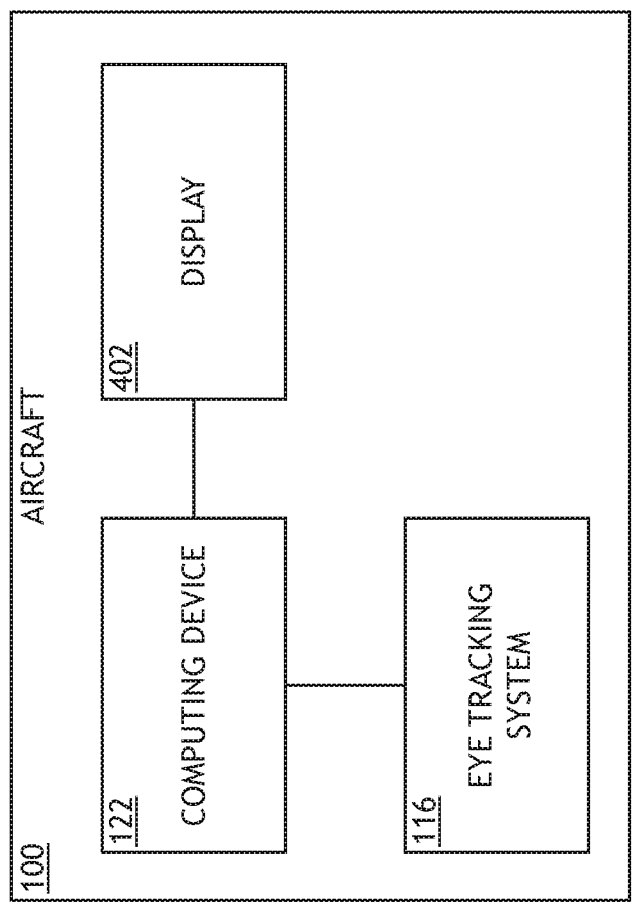
FIG. 4 is a view of an exemplary embodiment of a system including a vehicle including a head wearable device and a computing device according to the inventive concepts disclosed herein.

Referring now to FIG. 4, an exemplary embodiment of a system according to the inventive concepts disclosed herein may include a vehicle (e.g., the aircraft 100). The aircraft 100 may include at least one computing device 122, at least one display 402, and an eye tracking system 116, some or all of which may be communicatively coupled at any given time. While FIG. 1 exemplarily depicts elements of the system implemented in the aircraft 100, in some embodiments, elements of the system may be implemented in non-vehicular environments or in other types of vehicles, such as automobiles, spacecraft, trains, or watercraft.

The computing device 122 may be implemented similarly and function similarly to the computing device 122 of FIG. 1, except that the processor 124 of the computing device 122 may be additionally configured to perform one or more operations performed by the processor 108 of the head wearable device 102.

The display 402 may be implemented similarly and function similarly to the display 118 of FIG. 1, except that the display 402 may be a non-head-wearable-device display, such as a head-down display (HDD) or a head-up display (HUD). Additionally, the display 402 may be a touchscreen display.

The eye tracking system 116 may be implemented similarly and function similarly to the eye tracking system 116 of FIG. 1, except that the eye tracking system 116 may be a non-head-wearable-device eye tracking system 116.

Figure 5:
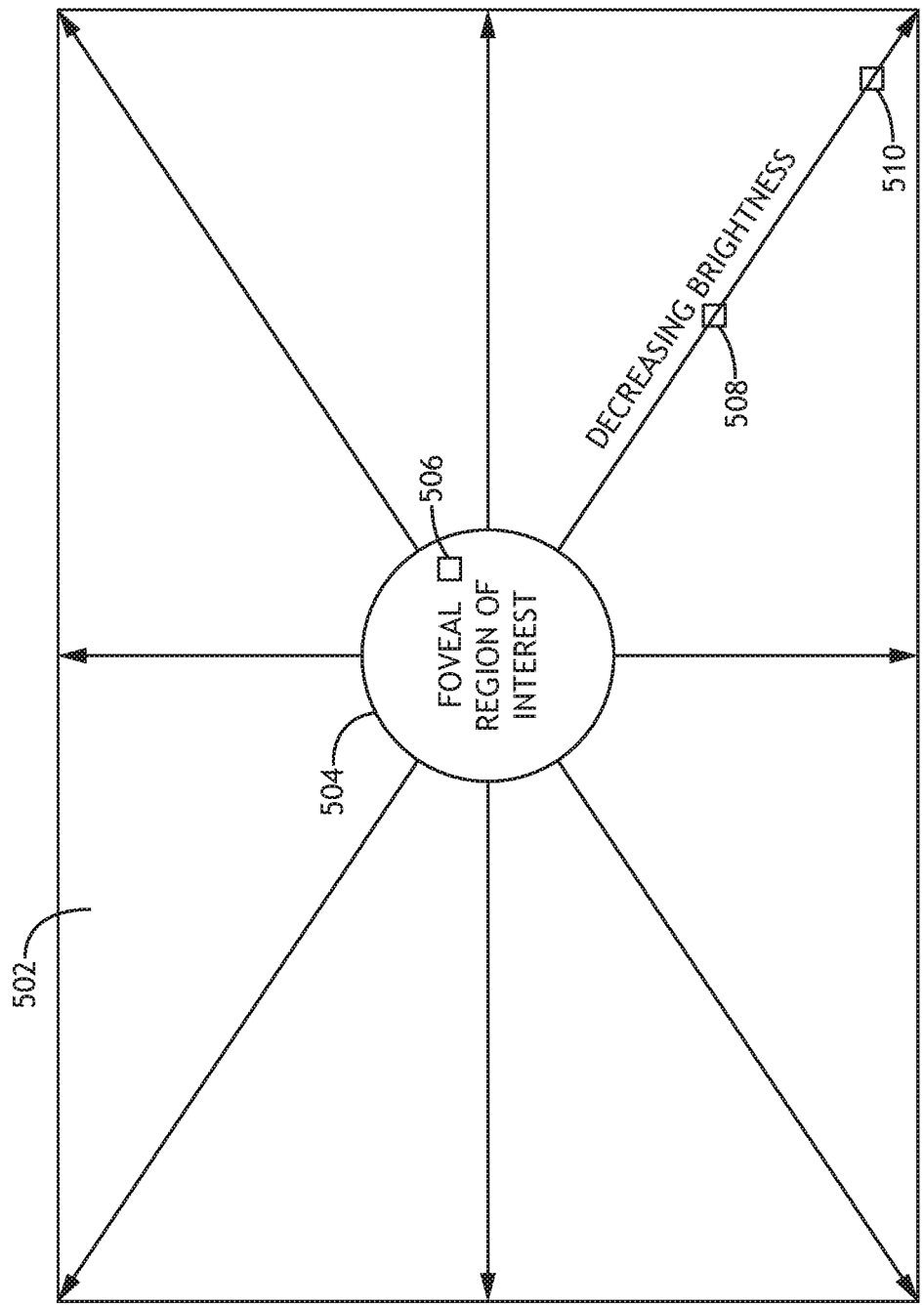
FIG. 5 is a view of an exemplary embodiment of a display of the system of FIGS. 1 and/or 4 according to the inventive concepts disclosed herein.

Referring now to FIG. 5, an exemplary embodiment of a display 502 of the system of FIGS. 1 and/or 4 according to the inventive concepts disclosed is shown. The display 502 may be implemented as one of the at least one display 118 or the at least one display 402.

At least one processor (e.g., 108 and/or 124) may be configured to control operation of the display 502, for example, as disclosed with respect to FIGS. 1 and 4. The processor may be configured to receive eye tracking data from the eye tracking system 116. The processor may be configured to determine a foveal region of interest 504 of the display 502 based on the eye tracking data and a position of the user's eye(s) relative to the display 402. The processor may be configured to perform at least one display modification operation. Performance of the at least one display modification operation may be configured to reduce a brightness profile for at least some of the pixels (e.g., non-foveal region pixel groups 508 and 510) outside of the foveal region of interest 504, wherein the reduced brightness profile is less than a foveal region brightness profile for foveal region pixels (e.g., foveal region pixel group 506) corresponding to the foveal region of interest 504. The foveal region of interest 504 may have a predetermined (e.g., default or relatively high brightness profile as compared to non-foveal region pixels) brightness profile. For example, the reduced brightness profile for the at least some of the pixels (e.g., non-foveal region pixel groups 508 and 510) outside of the foveal region of interest 504 may include a gradual reduction in pixel brightness as a distance from the foveal region of interest 504 increases. The gradual reduction in pixel brightness may extend radially in all directions from the foveal region of interest 504 as a distance from the foveal region of interest 504 increases. The gradual reduction in pixel brightness may be granulated with different brightness profiles for each sub-pixel, for each pixel, or for groups (e.g., 508 and 510) of pixels of predetermined size based on a distance from the foveal region of interest 504. For example, a brightness profile of the non-foveal region pixel group 508 may be brighter than the non-foveal region pixel group 510 as the non-foveal region pixel group 508 is closer to the foveal region of interest 504 than the non-foveal region pixel group 510.

For example, a non-uniform brightness or luminance gradient across the display 502 may be difficult for a human eye to notice if the gradient is relatively smoothly varying across the display 502 and if a magnitude of brightness variation is less than approximately 50% for a large display area.

For example, by determining the foveal region of interest 504, the processor may control the display 502 to have a brightness or luminance gradient that may emanate radially in all directions from the foveal region of interest 504 such that the foveal region of interest 504 may have a relatively high brightness (e.g., a maximum brightness) and locations on the display 502 farthest from the foveal region of interest 504 may have a relatively lower brightness (e.g., a lowest tolerable level of brightness).

Some embodiments may extend a lifetime of the display 502 due to the average time that a display area is driven at high (e.g., maximum) brightness being reduced based on the foveal region of interest 504 moving around on the display field of view over time.

Figure 6:
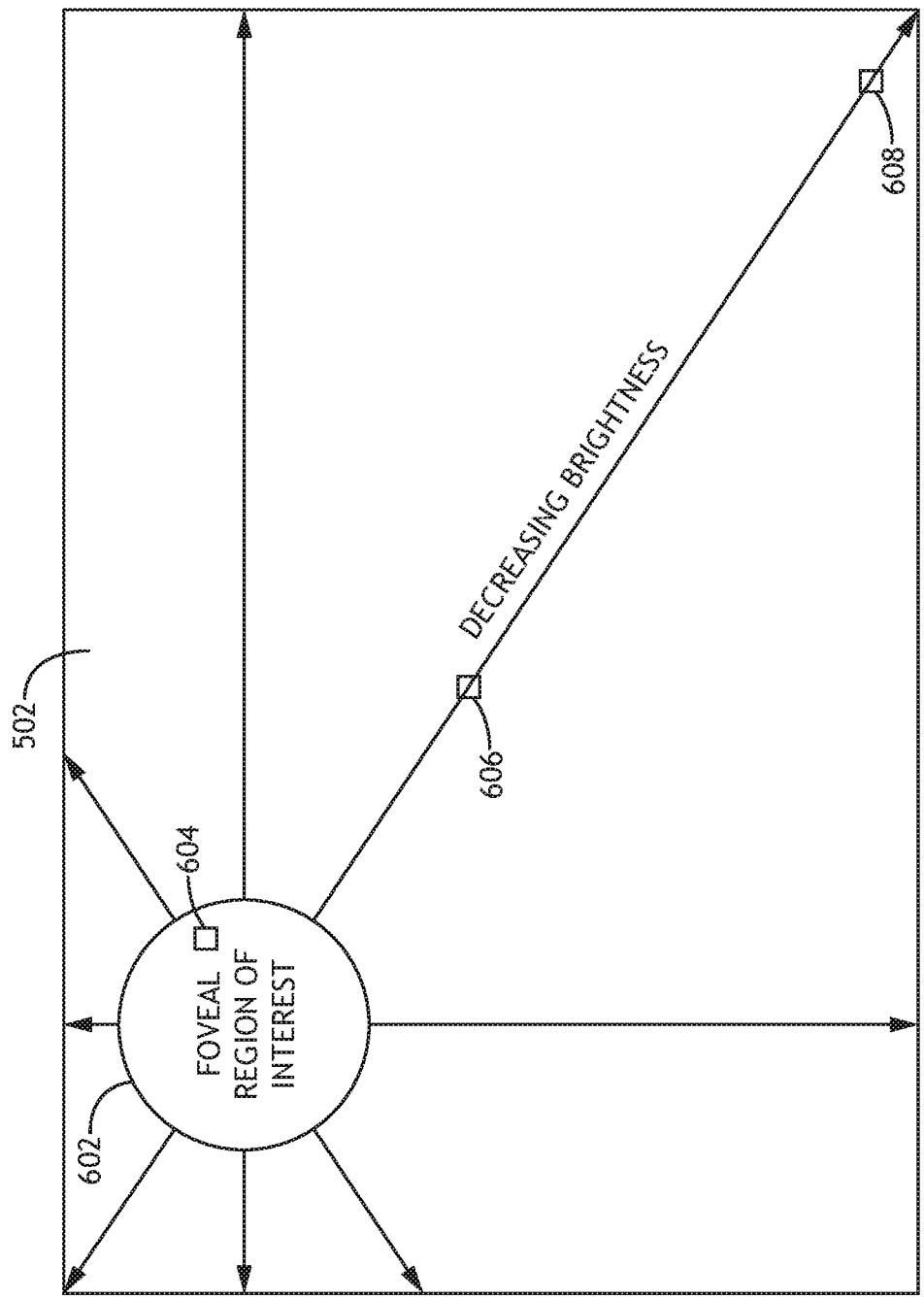
FIG. 6 is a view of an exemplary embodiment of a display of the system of FIGS. 1 and/or 4 according to the inventive concepts disclosed herein.

Referring now to FIG. 6, an exemplary embodiment of a display 502 of the system of FIGS. 1 and/or 4 according to the inventive concepts disclosed is shown. The display 502 including the foveal region of interest 602, foveal region pixel group 604, and non-foveal region pixel groups 606, 608 may be implemented similarly and function similarly as the display 502 as depicted in and described with respect to FIG. 5, except that the display 502 of FIG. 6 shows the foveal region of interest 602 as being non-centered on the display 502.

Referring now to FIGS. 7-10, exemplary embodiments of a display 502 of the system of FIGS. 1 and/or 4 according to the inventive concepts disclosed is shown. The display 502 may be implemented as one of the at least one display 118 or the at least one display 402.

At least one processor (e.g., 108 and/or 124) may be configured to control operation of the display 502, for example, as disclosed with respect to FIGS. 1 and 4. The processor may be configured to receive eye tracking data from the eye tracking system 116. The processor may be configured to determine a foveal region of interest of the display 502 based on the eye tracking data and a position of the user's eye(s) relative to the display 502. The processor may be configured to perform at least one display modification operation. Additionally, performance of the at least one display modification operation may be configured to modify at least one non-foveal region image portion, the non-foveal region image portion to be displayed outside of the foveal region of interest. The processor may be configured to cause the non-foveal region image portion to move, miniaturize, magnify, blur, oscillate, and/or orbit around a point, and this allows, for example, pixels that might otherwise depict brightly lit non-foveal region image portions (e.g., white text or white symbols) to reduce and spread the average brightness among nearly-located pixels (e.g., neighboring pixels).

As the foveal region of interest moves around the display 502 based on a user focusing different areas of the display 502, the previous foveal region of interest may change to a non-foveal region and some of the non-foveal region may change to a current foveal region of interest. The changing location of the foveal region of interest on the display allows the average time that a display area is driven at high (e.g., maximum) brightness to be reduced, which extends the lifespan of the display 502.

When a user changes their gaze from the foveal region of interest to another location on the display 502, the previously modified non-foveal region image portions may revert to default and normal operation of the display associated with the foveal region of interest; this may allow subtle modifications to the non-foveal region image portions to be imperceptible to the user as the user looks around on the display 502. Such imperceptible modifications to the display 502 may be important for high accuracy systems, such as targeting applications and overlay of symbology onto real world images.

Figure 7:
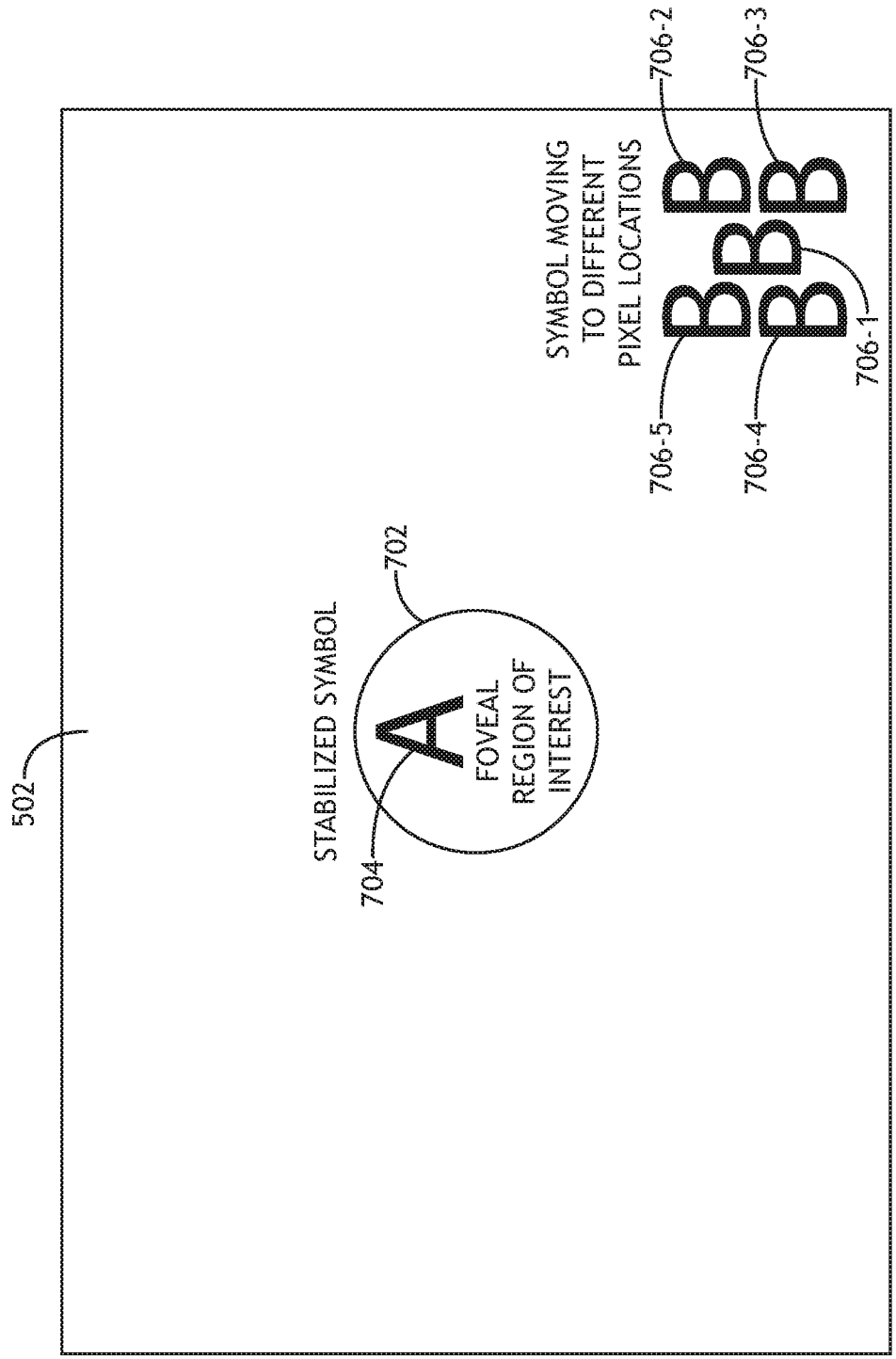
FIG. 7 is a view of an exemplary embodiment of a display of the system of FIGS. 1 and/or 4 according to the inventive concepts disclosed herein.

As shown in FIG. 7, the processor may be configured to maintain a high brightness and stabilized depiction of a foveal region image portion 704 (e.g., a graphical image portion or symbology (e.g., symbols or alphanumeric characters); e.g., depicted as "A") in a foveal region of interest 702 while moving at least one non-foveal region image portion (e.g., a graphical image portion or symbology (e.g., symbols or alphanumeric characters)). For example, such movements may include orbiting the at least one non-foveal region image portion around a nominal position, horizontal shifts, diagonal shifts, and/or vertical shifts. Such movements of non-foveal region image portions may be imperceptible by using slow and gradual movements over short distances. For example, the processor may be configured to move a non-foveal region image portion (e.g., depicted as "B") from a default location (e.g., location 706-1) to any of locations 706-2, 706-3, 706-4, and/or 706-5. For example, the processor may be configured to oscillate the non-foveal region image portion (e.g., depicted as "B") back and forth between a first location 706-1 and a second location (e.g., 706-2, 706-3, 706-4, or 706-5). Additionally, for example, the processor may be configured to repeatedly orbit the non-foveal region image portion around a central location (e.g., 706-1) by moving the non-foveal region image portion from location 706-1 to location 706-2 to location 706-3 to location 706-4 to location 706-5 to location 706-2.

Figure 8:
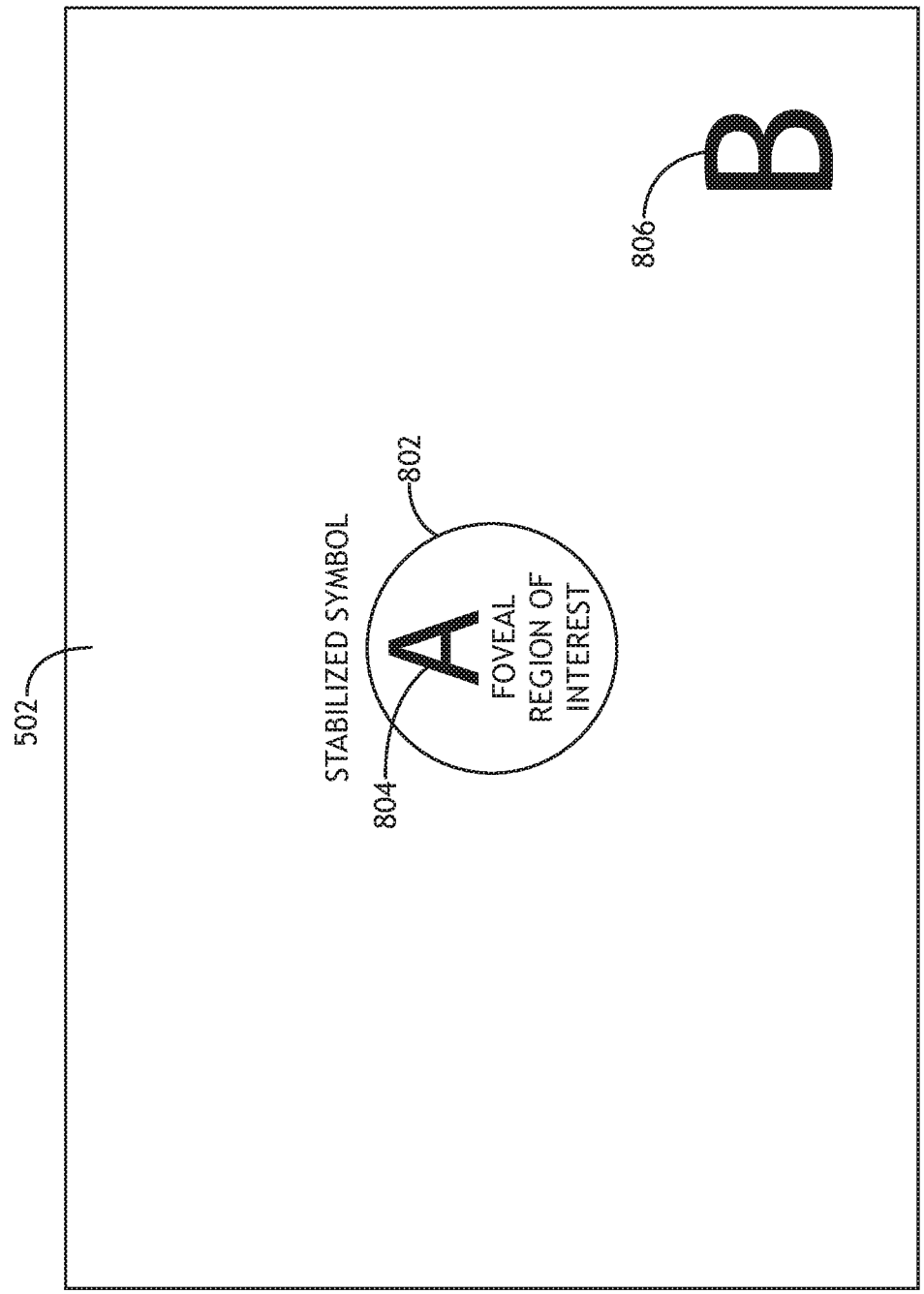
FIG. 8 is a view of an exemplary embodiment of a display of the system of FIGS. 1 and/or 4 according to the inventive concepts disclosed herein.

As shown in FIG. 8, the processor may be configured to maintain a high brightness and stabilized depiction of a foveal region image portion 804 in a foveal region of interest 802 while magnifying at least one non-foveal region image portion 806. In some embodiments, the processor may be configured to repeatedly change the size of the non-foveal region image portion 806 between a magnified size (e.g., as shown in FIG. 8) and a smaller size (e.g., as shown in FIGS. 7 and/or 9) and vice versa. In some embodiments, the processor may be configured to magnify some or all of the non-foveal region of the display 502.

Figure 9:
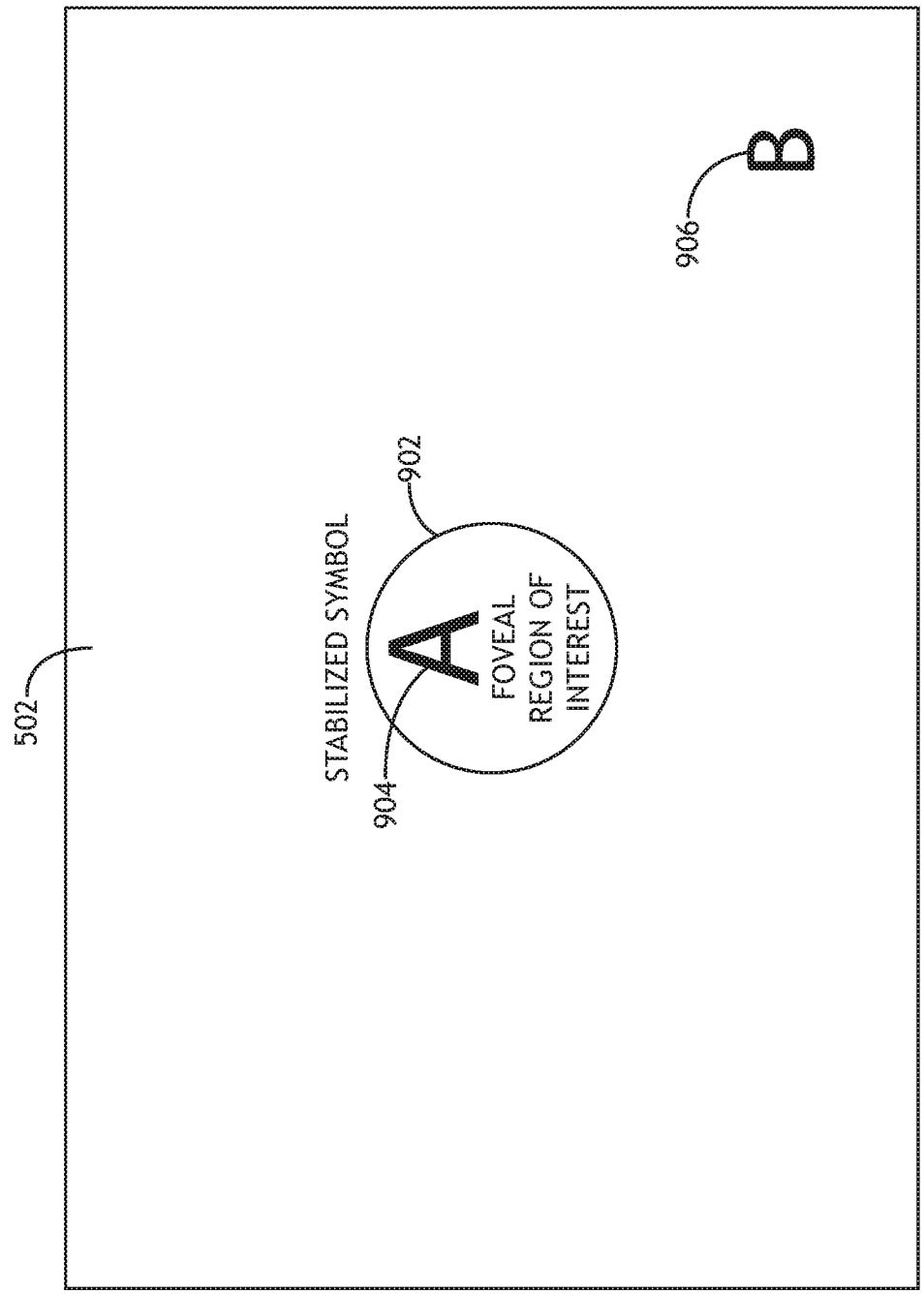
FIG. 9 is a view of an exemplary embodiment of a display of the system of FIGS. 1 and/or 4 according to the inventive concepts disclosed herein.

As shown in FIG. 9, the processor may be configured to maintain a high brightness and stabilized depiction of a foveal region image portion 904 in a foveal region of interest 902 while miniaturizing at least one non-foveal region image portion 906. In some embodiments, the processor may be configured to repeatedly change the size of the non-foveal region image portion 806 between a miniaturized size (e.g., as shown in FIG. 9) and a larger size (e.g., as shown in FIGS. 7 and/or 8) and vice versa. In some embodiments, the processor may be configured to miniaturize some or all of the non-foveal region of the display 502.

Figure 10:
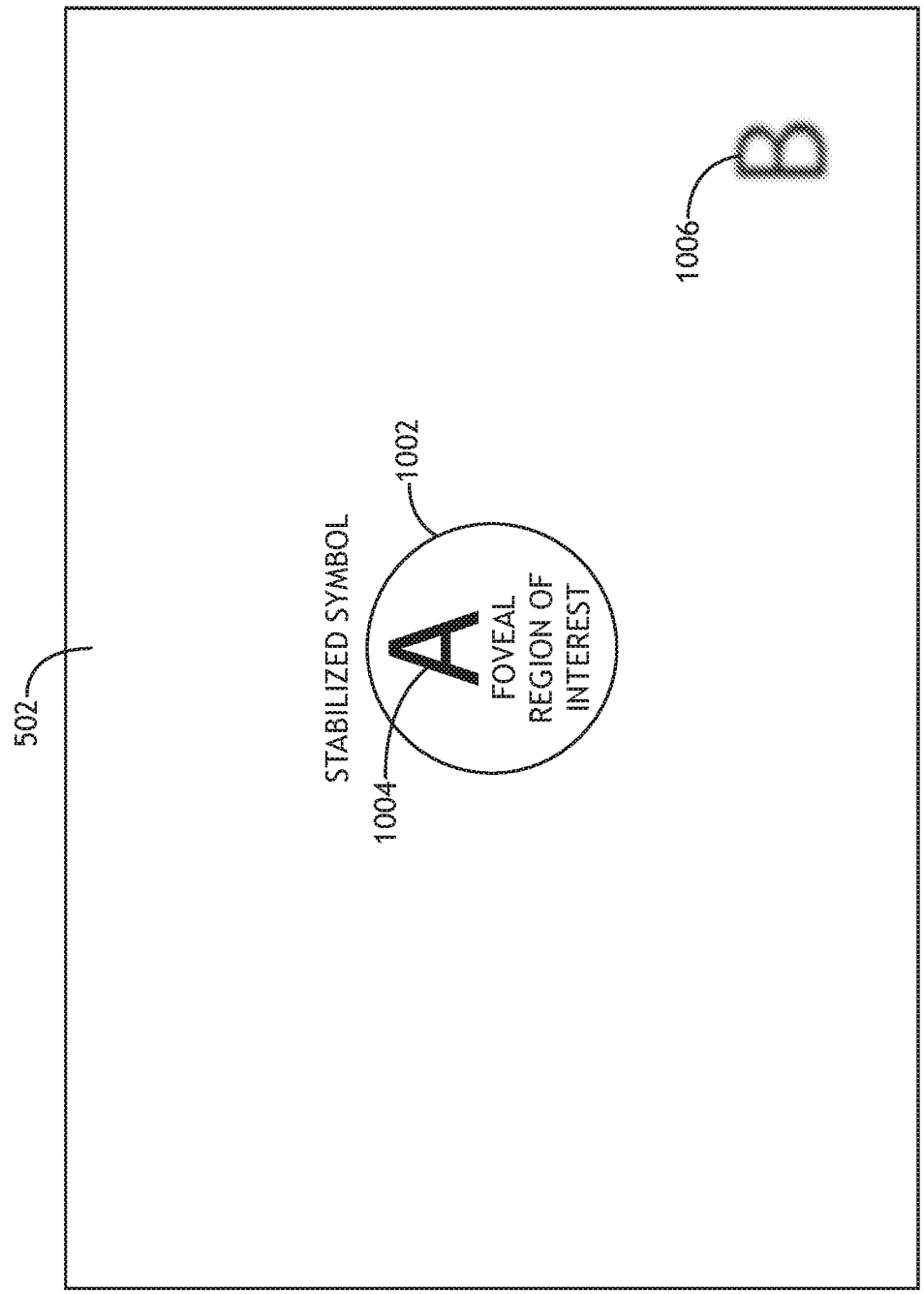
FIG. 10 is a view of an exemplary embodiment of a display of the system of FIGS. 1 and/or 4 according to the inventive concepts disclosed herein.

As shown in FIG. 10, the processor may be configured to maintain a high brightness and stabilized depiction of a foveal region image portion 1004 in a foveal region of interest 1002 while blurring at least one non-foveal region image portion 1006.

Figure 11:
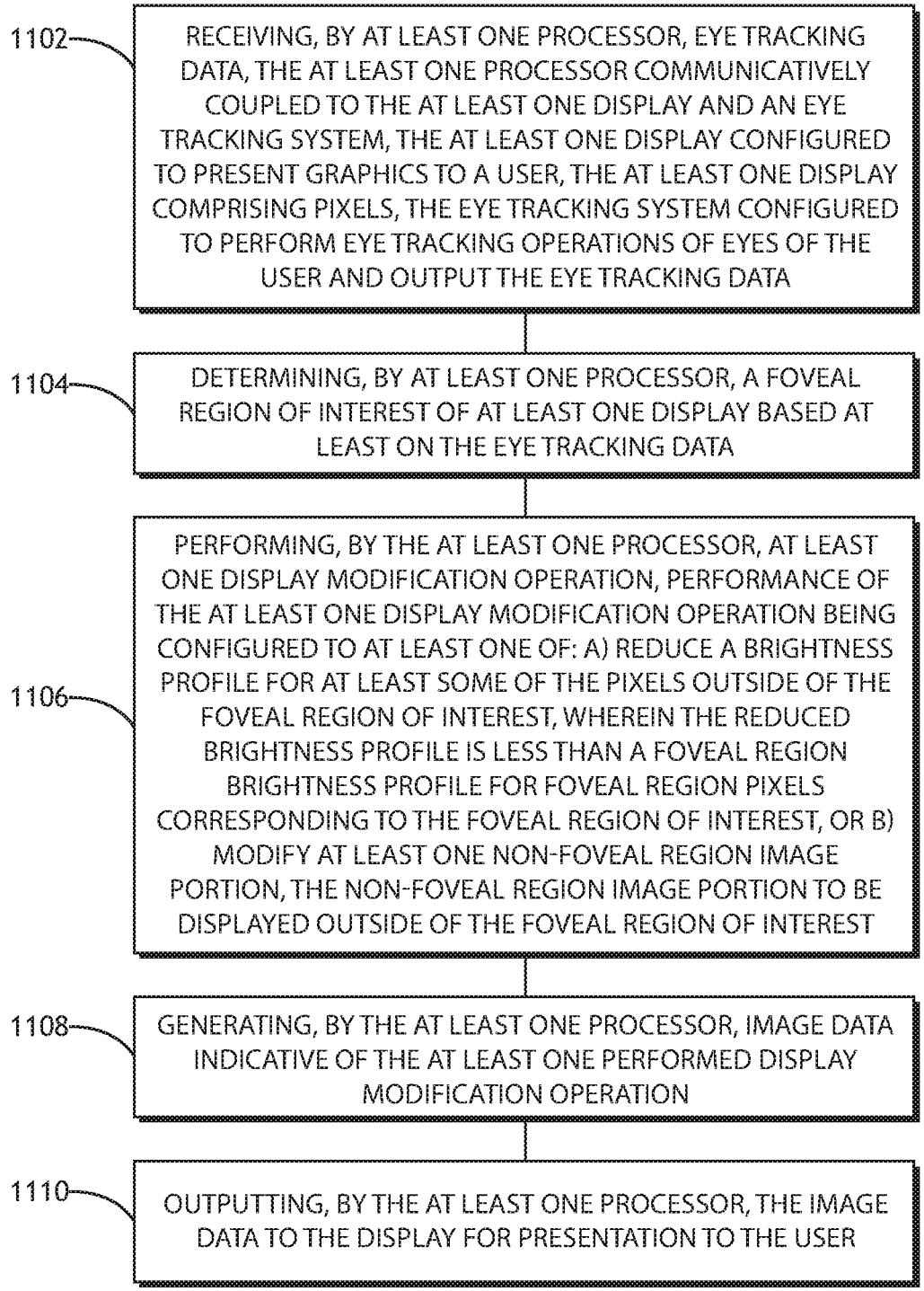
FIG. 11 is a diagram of an exemplary embodiment of a method according to the inventive concepts disclosed herein.

Referring now to FIG. 11, an exemplary embodiment of a method 1100 according to the inventive concepts disclosed herein may include one or more of the following steps. Additionally, for example, some embodiments may include performing one more instances of the method iteratively, concurrently, and/or sequentially. Additionally, for example, at least some of the steps of the method may be performed in parallel and/or concurrently. Additionally, in some embodiments, at least some of the steps of the method may be performed non-sequentially.

A step 1102 may include receiving, by at least one processor, eye tracking data, the at least one processor communicatively coupled to the at least one display and an eye tracking system, the at least one display configured to present graphics to a user, the at least one display comprising pixels, the eye tracking system configured to perform eye tracking operations of at least one eye of the user and output the eye tracking data.

A step 1104 may include determining, by the at least one processor, a foveal region of interest of at least one display based at least on the eye tracking data.

A step 1106 may include performing, by the at least one processor, at least one display modification operation, performance of the at least one display modification operation being configured to at least one of: a) reduce a brightness profile for at least some of the pixels outside of the foveal region of interest, wherein the reduced brightness profile is less than a foveal region brightness profile for foveal region pixels corresponding to the foveal region of interest, or b) modify at least one non-foveal region image portion, the non-foveal region image portion to be displayed outside of the foveal region of interest.

A step 1108 may include generating, by the at least one processor, image data indicative of the at least one performed display modification operation.

A step 1110 may include outputting, by the at least one processor, the image data to the display for presentation to the user.

Further, the method may include any of the operations disclosed throughout.

As will be appreciated from the above, embodiments of the inventive concepts disclosed herein may be directed to a method, system, and a device configured to extend the life of a display (e.g., an emissive display, such as a high-brightness organic light-emitting diode (OLED) display) by utilizing eye tracking.

As used throughout and as would be appreciated by those skilled in the art, "at least one non-transitory computer-readable medium" may refer to as at least one non-transitory computer-readable medium (e.g., memory 110, memory 126, memory 206, memory 306, storage 112, storage 128, storage 208, storage 308, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   at least one display configured to present graphics to a user, the at least one display comprising pixels;
   an eye tracking system configured to:
      perform eye tracking operations of at least one eye of the user; and
      output eye tracking data; and
   at least one processor communicatively coupled to the at least one display and the eye tracking system, the at least one processor configured to:
      receive the eye tracking data;
      determine a foveal region of interest of the at least one display based at least on the eye tracking data;
      perform at least one display modification operation, performance of the at least one display modification operation being configured to at least one of: a) reduce a brightness profile for at least some of the pixels outside of the foveal region of interest, wherein the reduced brightness profile is less than a foveal region brightness profile for foveal region pixels corresponding to the foveal region of interest, or b) modify at least one non-foveal region image portion, the at least one non-foveal region image portion to be displayed outside of the foveal region of interest;
      generate image data indicative of the at least one performed display modification operation; and
      output the image data to the at least one display for presentation to the user,
   wherein the at least one processor being configured to perform the at least one display modification operation comprises the at least one processor being configured to modify the at least one non-foveal region image portion, the at least one non-foveal region image portion to be displayed outside of the foveal region of interest,
   wherein the at least one processor being configured to modify the at least one non-foveal region image portion comprises the at least one processor being configured to cause the at least one non-foveal region image portion to oscillate.

2. The system of claim 1, wherein the at least one processor being configured to perform the at least one display modification operation further comprises the at least one processor being configured to reduce the brightness profile for the at least some of the pixels outside of the foveal region of interest, wherein the reduced brightness profile is less than the foveal region brightness profile for the foveal region pixels corresponding to the foveal region of interest.

3. The system of claim 2, wherein the reduced brightness profile for the at least some of the pixels outside of the foveal region of interest includes a gradual reduction in pixel brightness as a distance from the foveal region of interest increases.

4. The system of claim 1, wherein the at least one processor being configured to modify the at least one non-foveal region image portion further comprises the at least one processor being configured to cause the at least one non-foveal region image portion to move.

5. The system of claim 1, wherein the at least one processor being configured to modify the at least one non-foveal region image portion further comprises the at least one processor being configured to cause the at least one non-foveal region image portion to miniaturize.

6. The system of claim 1, wherein the at least one processor being configured to modify the at least one non-foveal region image portion further comprises the at least one processor being configured to cause to magnify the at least one non-foveal region image portion to magnify.

7. The system of claim 1, wherein the at least one processor being configured to modify the at least one non-foveal region image portion further comprises the at least one processor being configured to cause the at least one non-foveal region image portion to blur.

8. The system of claim 1, wherein the at least one processor being configured to modify the at least one non-foveal region image portion further comprises the at least one processor being configured to cause the at least one non-foveal region image portion to orbit around a point.

9. The system of claim 1, wherein the at least one display, the eye tracking system, and the at least one processor are implemented in a head wearable device.

10. The system of claim 9, wherein the head wearable device is a mixed reality head wearable device or a virtual reality head wearable device.

11. The system of claim 1, wherein the at least one display is a head down display.

12. The system of claim 1, wherein the at least one display is implemented in a vehicle.

13. The system of claim 1, wherein the at least one display is implemented in an aircraft.

14. The system of claim 1, wherein the at least one display comprises an emissive display.

15. The system of claim 1, wherein the at least one display comprises an organic light-emitting diode (OLED) display.

16. The system of claim 1, wherein the at least one display comprises a micro light-emitting diode (micro-LED) display.

17. A method, comprising:
    receiving, by at least one processor, eye tracking data, the at least one processor communicatively coupled to at least one display and an eye tracking system, the at least one display configured to present graphics to a user, the at least one display comprising pixels, the eye tracking system configured to perform eye tracking operations of at least one eye of the user and output the eye tracking data;
    determining, by the at least one processor, a foveal region of interest of the at least one display based at least on the eye tracking data;
    performing, by the at least one processor, at least one display modification operation, performance of the at least one display modification operation being configured to at least one of: a) reduce a brightness profile for at least some of the pixels outside of the foveal region of interest, wherein the reduced brightness profile is less than a foveal region brightness profile for foveal region pixels corresponding to the foveal region of interest, or b) modify at least one non-foveal region image portion, the at least one non-foveal region image portion to be displayed outside of the foveal region of interest;
    generating, by the at least one processor, image data indicative of the at least one performed display modification operation; and
    outputting, by the at least one processor, the image data to the display for presentation to the user,
    wherein performing the at least one display modification operation comprises modifying the at least one non-foveal region image portion, the at least one non-foveal region image portion to be displayed outside of the foveal region of interest,
    wherein modifying the at least one non-foveal region image portion comprises causing the at least one non-foveal region image portion to oscillate.

18. A system, comprising:
    at least one display configured to present graphics to a user, the at least one display comprising pixels;
    an eye tracking system configured to:
        perform eye tracking operations of at least one eye of the user; and
        output eye tracking data; and
    at least one processor communicatively coupled to the at least one display and the eye tracking system, the at least one processor configured to:
        receive the eye tracking data;
        determine a foveal region of interest of the at least one display based at least on the eye tracking data;
        perform at least one display modification operation, performance of the at least one display modification operation being configured to at least one of: a) reduce a brightness profile for at least some of the pixels outside of the foveal region of interest, wherein the reduced brightness profile is less than a foveal region brightness profile for foveal region pixels corresponding to the foveal region of interest, or b) modify at least one non-foveal region image portion, the at least one non-foveal region image portion to be displayed outside of the foveal region of interest;
        generate image data indicative of the at least one performed display modification operation; and
        output the image data to the at least one display for presentation to the user,
    wherein the at least one processor being configured to perform the at least one display modification operation comprises the at least one processor being configured to modify the at least one non-foveal region image portion, the at least one non-foveal region image portion to be displayed outside of the foveal region of interest,
    wherein the at least one processor being configured to modify the at least one non-foveal region image portion comprises the at least one processor being configured to cause the at least one non-foveal region image portion to orbit around a point.

19. The system of claim 18, wherein the at least one display, the eye tracking system, and the at least one processor are implemented in a head wearable device.

\* \* \* \* \*